Feb. 12, 1952 J. B. BRENNAN 2,584,980
ELECTRODE AND METHOD OF MAKING SAME
Filed May 29, 1948 2 SHEETS—SHEET 1
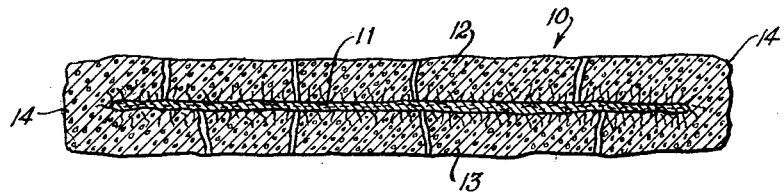
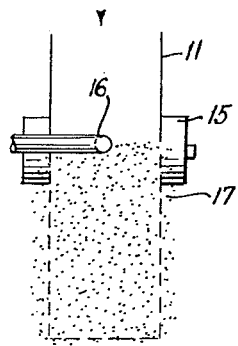 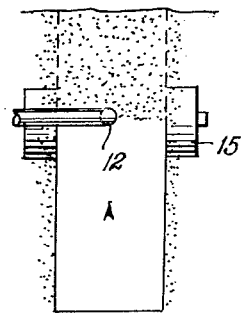
INVENTOR.
JOSEPH B. BRENNAN
BY *West & Oldham*
ATTORNEYS.

Feb. 12, 1952 — J. B. BRENNAN — 2,584,980
ELECTRODE AND METHOD OF MAKING SAME
Filed May 29, 1948 — 2 SHEETS—SHEET 2
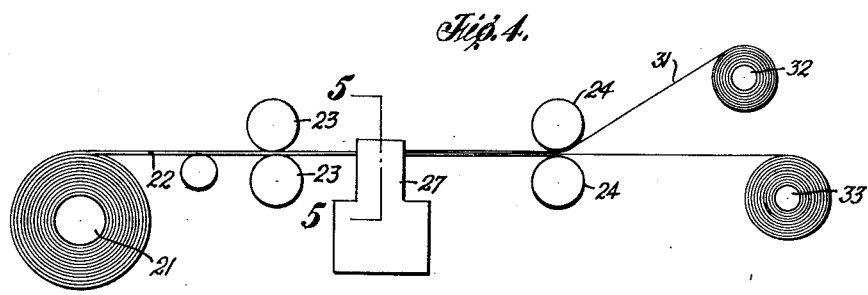
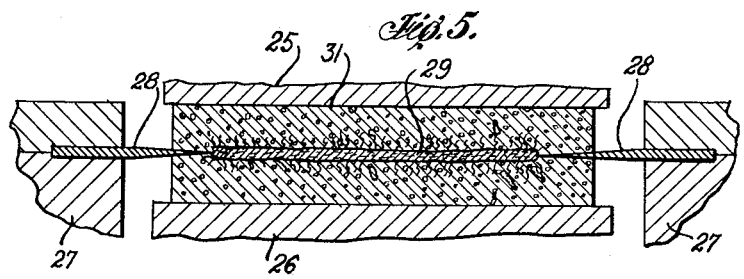
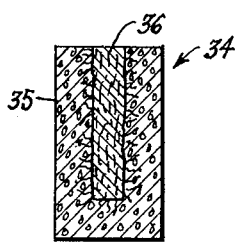
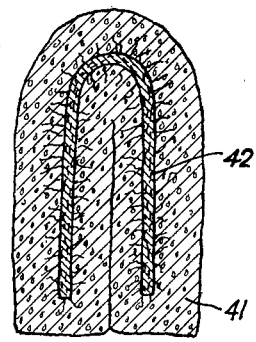
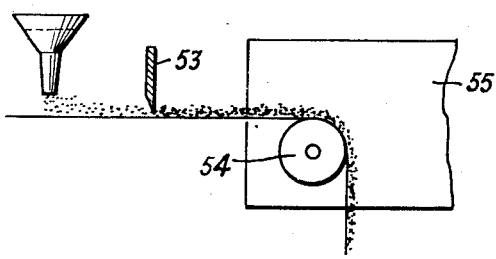
INVENTOR.
JOSEPH B. BRENNAN
BY
West & Oldham
ATTORNEYS Patented Feb. 12, 1952

2,584,980

UNITED STATES PATENT OFFICE 2,584,980

ELECTRODE AND METHOD OF MAKING SAME

Joseph B. Brennan, Cleveland, Ohio

Application May 29, 1948, Serial No. 29,987

7 Claims. (Cl. 175—315)

This invention relates to electrodes for use in making electrolytic condensers, especially to novel electrodes and to methods of making same.

Heretofore, there have been various types of electrodes provided for use in electrolytic condensers and a variety of methods have been suggested for use in making such electrodes. The electrodes have, in some instances, comprised a porous backing member which has its opposite surfaces coated with conductive metallic material, such as aluminum, which has been sprayed onto the opposite surfaces of the backing material so as to produce porous metal surfaces thereon. However, it has been difficult to make such electrodes so as to render their electrical properties and characteristics uniform over different areas of the electrode.

The general object of the present invention is to provide an electrode which has uniform electrical properties.

Another object of the invention is to provide an inexpensive, uncomplicated method for making an electrode of the class described, which electrode has desirable electrical properties.

Another object of the invention is to provide a novel type of electrode that can be easily separated into two or more members so as to form a plurality of electrodes therefrom.

Another object of the invention is to provide an economical, easily practiced method for making electrodes of the class described.

Another object of the invention is to provide an electrode wherein a base strip is completely enclosed in the electrode and wherein strips of porous metal on opposite surfaces of a backing strip have continuous connecting electrical conductive edge portions.

The foregoing and other objects and advantages of the invention will be made apparent as the specification proceeds.

Attention is now directed to the accompanying drawings wherein:

Fig. 1 illustrates, in transverse section, an electrode embodying the principles of the invention;

Fig. 2 is a plan of diagrammatic apparatus for practicing the first step of a method of the invention;

Fig. 3 is a view similar to Fig. 2 of the next step in the method of invention;

Fig. 4 is a diagrammatic indication of apparatus for practicing one operation of a method of the invention;

Fig. 5 is an enlarged fragmentary transverse section of the apparatus shown in Fig. 4, taken on the line 5—5 thereof;

Figs. 6 and 7 are transverse sections of modified types of electrodes of the invention; and Fig. 8 is a diagrammatic view of apparatus for practicing a modification of the invention.

Throughout the specification and drawings, corresponding reference numerals relate to the same parts so as to facilitate description of the invention.

Fig. 1 shows an electrode generally indicated by the numeral 10. The electrode 10 has a fibrous backing strip 11 which is formed from a strip of porous, thin, fibrous material, such as paper, matted fibers, etc. This backing strip 11 has a porous metal strip 12 associated with and bonded to one surface thereof and extending beyond the edges of the backing strip whereas a similar porous metal strip 13 is bonded to the opposite surface of the backing strip and also protrudes beyond the lateral margins of same. The strips 12 and 13 combine to make a structure which may be considered to comprise a porous, conductive flattened tube which completely encloses and surrounds the porous backing strip 11. An important feature of the present invention is that the strips 12 and 13 combine to produce metallic, porous, conductive, continuous edge portions 14 on the electrode 10. These edge portions 14 connect the metal strips 12 and 13 so that there can be no difference in the electrical potential of such strips at any time. Furthermore, the edge portions 14 provide electrical connections to facilitate current flow between the separate metal strips 12 and 13 and hence a flow of current to and through the electrode is facilitated by the conductive edge portions provided thereon.

Figs. 2 and 3 show one method in which the electrode 10 may be made. In this instance, the backing strip 11 is fed over the surface of a roll 15 which has a conventional metal spray device 16, such as a Schoop pistol, associated therewith. The device 16 is adapted to spray metal particles 17 onto the backing strip 11 and roll 15 so as to produce a metal strip therefrom. The metallic particles coalesce with each other as they are deposited and also bond with the backing strip so as to form an integral structure therefrom. Fig. 2 indicates that the particles 17 extend beyond the lateral margins of the strip 11 and some of such protruding portions of the deposited material will be used to make the edge portions 14 of the electrode 10. Fig. 3 indicates a second operation in making the electrode 10 wherein the backing strip has been inverted and the untreated surface of same is exposed as the backing strip 11 is again passed over the roll 15, or a second roll similar thereto, so that the device 16 can deposit metal particles to make a second continuous metal strip onto the opposite surface of the backing strip. Such second metallic strip will also have portions thereof that protrude laterally beyond the margins of the backing strip whereby the metallic particles forming such edge portions of the metal strip will initially deposit on and bond to the edge portions of the first metal strip that also extend laterally beyond the backing strip. Hence a good electrical bond and contact is formed between the strips of metal carried on opposite sides of the electrode. Some of the metallic particles 17 that deposit upon the roll 15 will adhere or bond to the remaining particles that deposit on the strip 11 and be pulled from the roll with the strip. The particles remaining on the roll 15 after removing the metal covered strip therefrom should be continuously scraped off of same. The roll 15 must ordinarily be artificially cooled to facilitate rapid solidification of metallic particles contacting same and formation of a porous metal strip.

In Fig. 4, a storage reel 21 is shown on which electrode strip 22, similar to the electrode 10, is stored. The electrode strip 22 is led from the reel 21 between a pair of guide rolls 23 and ultimately between a second pair of guide rolls 24. One or both of the guide rolls 24 may be driven, as desired, so that the electrode strip 22 is tautly positioned as it moves between the sets of guide rolls. The electrode strip 22 is drawn through the predetermined path, as outlined above, in order that the strip can be separated and two electrodes of the same width of the original electrode can be produced therefrom. Thus the electrode strip 22 may pass between guide plates 25 and 26, as best shown in Fig. 5, as it passes through a frame 27 that is positioned between the sets of rolls 23 and 24. The frame 27 extends laterally beyond the electrode strip 22 and is slightly spaced laterally therefrom so that knives or cutters 28 may be secured to the frame 27 and extend inwardly of the electrode strip to the lateral margins of a backing strip 29 provided therein. The knives 28 are operated to sever an upper strip 31 of the electrode from the remainder of the metallic portions of the electrode. As illustrated, the knives will not function to cut the metallic strip 31 from the backing strip 29 since the metallic strip normally can be pulled out of engagement with the remainder of the electrode and the backing strip 29 will usually adhere partly to the strip 31 and partly to the rest of the electrode. However, if desired, the knives 28 might be extended so as to meet at the center portion of the electrode 22 and completely cut the metal strip 31 therefrom. Fig. 4 shows that two rolls 32 and 33 are provided to receive portions of the electrode 22 passing between the rolls 24. These storage rolls 32 and 33 are driven in any desired manner and the metallic strip 31 will pass to the roll 32 whereas the remainder of the electrode 22 will be led to and deposit on the roll 33.

The electrode strip 22 may also be cut into two strips by positioning the knives 28 vertically and severing the metal edge portions from the strip after which the strip can easily be separated at the paper base strip a portion of which will be bonded to each of the covering metal layers.

Fig. 6 shows another novel electrode 34 which comprises a relatively U-shaped porous metal layer 35 which receives a backing strip 36 between the arms of the U-shaped metal portion of the electrode. The electrode 34, it will be seen, can be formed by splitting an electrode similar to the electrode 10 along a longitudinal axis. The material from which the electrode 34 is formed can, of course, be of any desired size but preferably would be formed to a lateral width which is twice the height of the electrode 34 so that by cutting such starting material completely through on its longitudinal axis, two electrodes similar to the electrode 34 would be formed.

Fig. 7 shows an electrode 41 that is made by folding an electrode like the electrode 10 longitudinally upon itself so as to form a substantially U-shaped electrode the entire outer surface of which is in good electrical association. The electrode 41 has porous metal surfaces and a paper base strip 42.

One type of apparatus for sintering metal powder together to form a porous metal layer on an electrode strip is shown in Fig. 8. A paper base strip 51 is led under a hopper 52 that contains aluminum particles P which deposit a layer thereof onto the strip as it is led under the hopper. A doctor blade 53 may be used to aid in spreading the particles P uniformly over the surface of the strip 51 after which the strip passes around a cooling roll 54 in an oven 55. The cooling roll 54 serves to retain the paper strip 51 to cool enough to resist combustion while the heated gases in the oven 55 cause the particles P to heat rapidly to a sufficiently elevated temperature to sinter together. When coating the opposite side of the strip 51 with metal, the first metal layer will aid in transmitting heat away from the base strip to prevent its combustion.

The electrode of the invention, as shown in Fig. 1, usually is only about .004 to .006 inch in thickness.

The paper base strip for the electrode is fibrous and will have fibers extending into the porous metal there-adjacent. The paper strip is soft and of low strength to permit the strip to be easily pulled apart when practicing the method shown in Fig. 5.

From the foregoing, it will be seen that a novel type of electrode has been supplied by the invention in that an electrode having porous metal surfaces on opposite sides of a backing strip can be provided with the continuous, conductive metallic edge portion that connects the face metal strips of the electrode to form a good electrical connection therebetween. Even when an electrode such as the electrode 10 is slit longitudinally so as to produce an electrode such as the electrode 34, a continuous edge connecting portion is still provided between metallic strips on opposite surfaces of a backing strip. Furthermore, if the electrode does not require the use of two metallic or conductive surfaces on opposite sides of a backing strip, then the invention can be used to provide an economical method of manufacturing two electrodes from one easily formed electrode by an inexpensive, readily practiced cutting or slitting operation.

The metal electrode strip of the invention is of substantially uniform composition throughout although it has primarily a metal outer layer and a fibrous center. The fibers extend all through the strip. Also, the cells in the strip intercommunicate to produce a porous product.

This application is a continuation-in-part of my copending application Ser. No. 591,909 filed May 4, 1945, which itself is a continuation-in-part of my previous patent application Ser. No. 227,316 filed August 29, 1938, and now covered in Patent No. 2,375,211 issued May 8, 1945.

While several complete embodiments of the invention have been disclosed herein, it will be appreciated that modification of these particular embodiments of the invention may be resorted to without departing from the scope of the invention as defined by the appended claims.

Having thus described my invention, what I claim is:

1. An electrode comprising a center strip of porous fibrous material and layers of a porous metallic mass intimately bonded to said strip on opposed sides thereof, said layers of porous metallic mass extending beyond the lateral marginal edges of said center strip, the portions of said layers of metallic mass extending beyond the edges of the center strip being integrally bonded together to form an integral conductive connection between the extended portions of the layers of metallic mass of a thickness at least equal to the thickness of one of said layers of metallic mass, said layers of metallic mass bonded together at their edges providing a flattened tube of metallic mass encompassing said center strip.

2. An electrode according to claim 1 in which the electrode is relatively flat and elongated and is longitudinally folded on itself.

3. An electrode comprising a center strip of porous fibrous material and layers of a porous metallic mass intimately bonded to said strip on opposed sides thereof, said layers of porous metallic mass extending beyond one of the lateral marginal edges of said center strip, the portions of said layers of metallic mass extending beyond said edge of the center strip being integrally bonded together to form an integral conductive connection between the extended portions of the layers of metallic mass of a thickness at least equal to the thickness of one of said layers of metallic mass.

4. A method of making electrode strips comprising covering one side of a porous base strip with a layer of a porous metallic mass having portions extending beyond the lateral marginal edges of said base strip, covering the opposite side of the porous base strip with a layer of the porous metallic mass having portions extending beyond the lateral marginal edges of said base strip, bonding the portions of both layers of porous mass extending beyond the lateral marginal edges of the base strip together to form an integral conductive connection between the extended portions of the layers of metallic mass of a thickness at least equal to the thickness of one of said layers of metallic mass.

5. A method of making electrode strips comprising covering one side of a porous base strip with a layer of a porous metallic mass having portions extending beyond the lateral marginal edges of said base strip, covering the opposite side of the porous base strip with a layer of the porous metallic mass having portions extending beyond the lateral marginal edges of said base strip, bonding the portions of both layers of porous mass, extending beyond the lateral marginal edges of the base strip together to form an integral conductive connection between the extended portions of the layers of metallic mass of a thickness at least equal to the thickness of one of said layers of metallic mass, longitudinally slitting the thus formed strip, and separating it into two strips.

6. A method of making electrode strips comprising covering one side of a porous base strip with a layer of a porous metallic mass having portions extending beyond the lateral marginal edges of said base strip, covering the opposite side of the porous base strip with a layer of the porous metallic mass having portions extending beyond the lateral marginal edges of said base strip, bonding the portions of both layers of porous mass extending beyond the lateral marginal edges of the base strip together to form an integral conductive connection between the extended portions of the layers of metallic mass of a thickness at least equal to the thickness of one of said layers of metallic mass, longitudinally slitting the bonded portions of the layers of the metallic mass extending beyond the edges of the base strip intermediate the outer surfaces of the layers and into the marginal edges of the base strip, and separating the two layers of metallic mass.

7. A method of making electrode strips comprising covering one surface of a porous base strip with a layer of a porous metallic mass having portions extending beyond the lateral marginal edges of said base strip, covering the opposite surface of the porous base strip with a layer of the porous metallic mass having portions extending beyond the lateral marginal edges of said base strip, bonding the portions of both layers of porous mass extending beyond the lateral marginal edges of the base strip together to form an integral conductive connection between the extended portions of the layers of metallic mass of a thickness at least equal to the thickness of one of said layers of metallic mass, and longitudinally slitting the thus formed strip intermediate its said marginal edges to form two electrode strips, each of which consists of a portion of the base strip with the layers of metallic mass on opposite sides thereof and bonded together at one edge.

JOSEPH B. BRENNAN.

REFERENCES CITED

The following references are of record in the file of this patent:

UNITED STATES PATENTS

| Number | Name | Date |
| --- | --- | --- |
| 2,037,848 | Brennan | Apr. 21, 1936 |
| 2,104,018 | Brennan | Jan. 4, 1938 |
| 2,177,819 | Booe | Oct. 31, 1939 |
| 2,218,162 | Brock | Oct. 15, 1940 |
| 2,278,161 | Brennan | Mar. 31, 1942 |
| 2,297,607 | Blackburn | Sept. 29, 1942 |
| 2,375,211 | Brennan | May 8, 1945 |
| 2,444,914 | Brennan | July 13, 1948 |
| 2,471,395 | Keuffel | May 24, 1949 |